(12) United States Patent
Belotserkovsky et al.

(10) Patent No.: US 7,085,282 B2
(45) Date of Patent: Aug. 1, 2006

(54) METHOD AND APPARATUS FOR PROVIDING FORWARD ERROR CORRECTION

(75) Inventors: Maxim B. Belotserkovsky, Indianapolis, IN (US); Dong-Chang Shiue, Carmel, IN (US)

(73) Assignee: Thomson Licensing, Billancourt (FR)

( * ) Notice: Subject to any disclaimer, the term of this patent is extended or adjusted under 35 U.S.C. 154(b) by 27 days.

(21) Appl. No.: 10/611,577

(22) Filed: Jul. 1, 2003

(65) Prior Publication Data

US 2005/0002416 A1   Jan. 6, 2005

(51) Int. Cl.
*H04B 7/212* (2006.01)
*H04J 3/24* (2006.01)
*H03M 13/00* (2006.01)

(52) U.S. Cl. .............. 370/442; 370/474; 370/347; 714/752

(58) Field of Classification Search ........... 370/321, 370/336, 337, 345, 347, 442, 458, 474, 498; 714/752, 758, 799
See application file for complete search history.

(56) References Cited

U.S. PATENT DOCUMENTS

| | | | | |
|---|---|---|---|---|
| 5,742,640 A | * | 4/1998 | Haoui et al. | 375/220 |
| 5,968,198 A | * | 10/1999 | Hassan et al. | 714/752 |
| 6,141,788 A | * | 10/2000 | Rosenberg et al. | 714/774 |
| 6,490,260 B1 | * | 12/2002 | Hwang | 370/335 |
| 6,697,441 B1 | * | 2/2004 | Bottomley et al. | 375/340 |
| 6,757,654 B1 | * | 6/2004 | Westerlund et al. | 704/262 |
| 2002/0056064 A1 | * | 5/2002 | Kidorf et al. | 714/755 |
| 2003/0192001 A1 | * | 10/2003 | Maiuzzo et al. | 714/755 |

FOREIGN PATENT DOCUMENTS

| | | |
|---|---|---|
| EP | 1401140 A2 * | 3/2004 |
| GB | 2357017 A * | 6/2001 |

* cited by examiner

*Primary Examiner*—Chau Nguyen
*Assistant Examiner*—Tri H. Phan
(74) *Attorney, Agent, or Firm*—Joseph J. Laks; Ronald H. Kurdyla; Vincent E. Duffy

(57) ABSTRACT

The disclosed embodiments relate to a system for generating forward error correction (FEC) packets. The system includes a first FEC encoder that receives data and encodes first FEC data with the data to form FEC encoded data. Also included in the system is a second FEC encoder that encodes the FEC encoded data to produce second FEC data. An FEC packet formatter formats the second FEC data into an FEC packet.

18 Claims, 3 Drawing Sheets

US 7,085,282 B2

METHOD AND APPARATUS FOR PROVIDING FORWARD ERROR CORRECTION

FIELD OF THE INVENTION

The present invention relates to providing forward error correction (FEC) in a time division multiple access (TDMA) communication system.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In a TDMA communication system, a base unit facilitates communication between other base units and multiple local mobile terminals (MTs). The base unit and the mobile terminals are typically capable of transmitting and receiving a data signal at a particular frequency or group of frequencies. The data signal is broken into a number of smaller increments known as time slots, which may recur during each cycle of the data signal. During a given communication session, a mobile terminal may be assigned a particular time slot. The data from that mobile terminal may be transmitted in the assigned time slot for the duration of a communication session. For a given base station environment, it is typical for at least some timeslots to be unused at a given time.

FEC is a technology that is useful in improving digital communications, including TDMA communications. In a communication system employing FEC, error correcting parity bits may be transmitted in conjunction with packets containing actual communication data. The error correcting parity bits can be used on the receiving end of a data transmission to reassemble data accurately.

FEC may allow data to be transmitted using lower power than would otherwise be possible because FEC systems are able to overcome or tolerate some degree of erroneous data. The strength of FEC is typically proportional to the number of FEC parity bits that are transmitted for a given number of data bits. Systems employing strong FEC codes (for example, by using more parity bits per data bit) are able to tolerate larger numbers of erroneous data bits and still allow accurate reassembly of data packets. Such systems may facilitate lower transmitter power, longer battery life and increased range of mobile terminals for a given information throughput.

However, the transmission scheme parameters (such as the modulation type, FEC scheme, allowed bandwidth, medium access control and the like) for a given communication system have typically been defined and fixed. In such systems, the only way to increase the range of mobile terminals (or reduce the power consumption for a given range and throughput) has traditionally been to increase the transmitter power, which shortens the battery life. An apparatus and method that improves the FEC capability in TDMA communications systems is desirable.

SUMMARY OF THE INVENTION

The disclosed embodiments relate to a system for generating forward error correction (FEC) packets. The system includes a first FEC encoder that receives data and encodes first FEC data with the data to form FEC encoded data. Also included in the system is a second FEC encoder that encodes the FEC encoded data to produce second FEC data. An FEC packet formatter formats the second FEC data into an FEC packet.

DETAILED DESCRIPTION OF THE PREFERRED EMBODIMENT

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
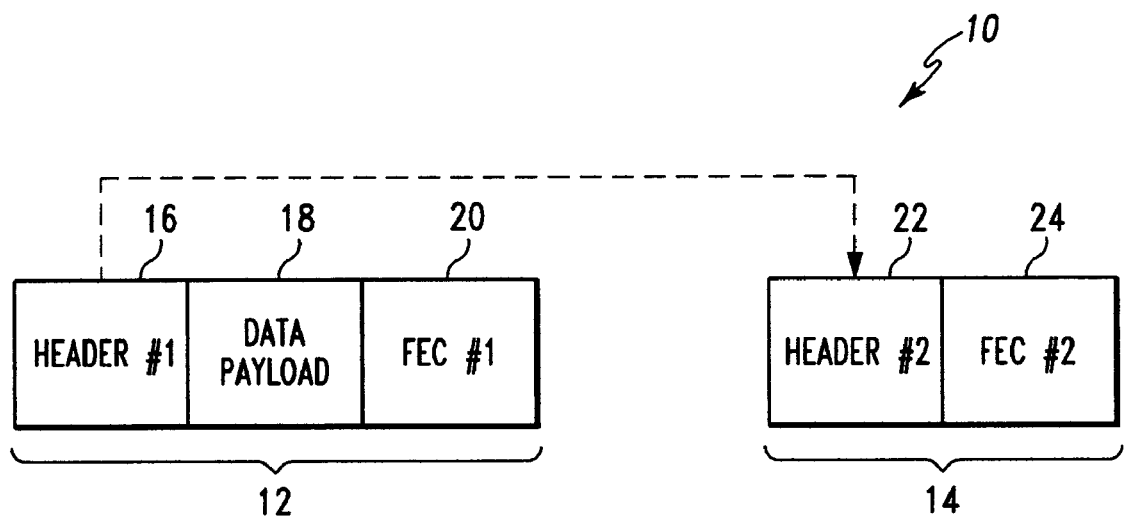
FIG. 1 is a block diagram showing exemplary data and FEC packets in accordance with an embodiment of the present invention.

FIG. 1 is a block diagram showing exemplary data and FEC packets in accordance with an embodiment of the present invention. The diagram, which is generally referred to by the reference numeral 10, includes a data packet 12 and an FEC packet 14. As used herein, the expression "data" standing alone refers to the communication data that represents a data signal. Error correction data such as FEC parity bits is referred to as "FEC data." A TDMA communication system may employ packets such as the data packet 12 and the FEC packet 14 to provide communication between a base unit and a multitude of mobile terminals.

The data packet 12 comprises a first header 16, a data payload 18 and a first bit or bits of FEC data 20. The FEC packet 14 comprises a second header 22 and a second bit or bits of FEC data 24. The header 16 may include pointer data that points to the header 22, as shown by the dashed arrow. Accordingly, the header 16 relates the FEC data 24 to the data packet 12.

Embodiments of the present invention may exploit the fact that it is unlikely that all TDMA time slots are occupied (being used) at any given time. This is true because of the unlikelihood that all users associated with a particular TDMA base station are active at any particular time. The unused TDMA time slots may then be used to transmit additional packets (such as the FEC packet 14) that carry additional FEC parity bits. Those of ordinary skill in the art will appreciate that, while the exemplary embodiments disclosed herein employ the use of unused TDMA time slots to transmit additional FEC parity data, other methods of distributing the additional FEC parity data across unused bandwidth may be used.

The FEC data 24, which is carried in the FEC packet 14, comprises FEC parity bits for a systematic block code for the currently active mobile terminals. The use of a systematic block code ensures that the original data bits may be recovered without using the additional parity bits, which may be offloaded to the FEC packet 14. The FEC packet 14 may be generated or used only when there is sufficient available bandwidth (unused time slots) to allow its use.

Advantageously, the data payload 18 is not changed whether the additional FEC packet 14 is employed or not. Thus, the average information transfer rate for a given mobile terminal stays the same. During periods when the FEC packet 14 is used, the advantages of employing a stronger FEC code than would otherwise be available are enjoyed. These advantages may include the ability to lower the power of the transmitter in a mobile terminal without changing the average data transfer rate.

Figure 2:
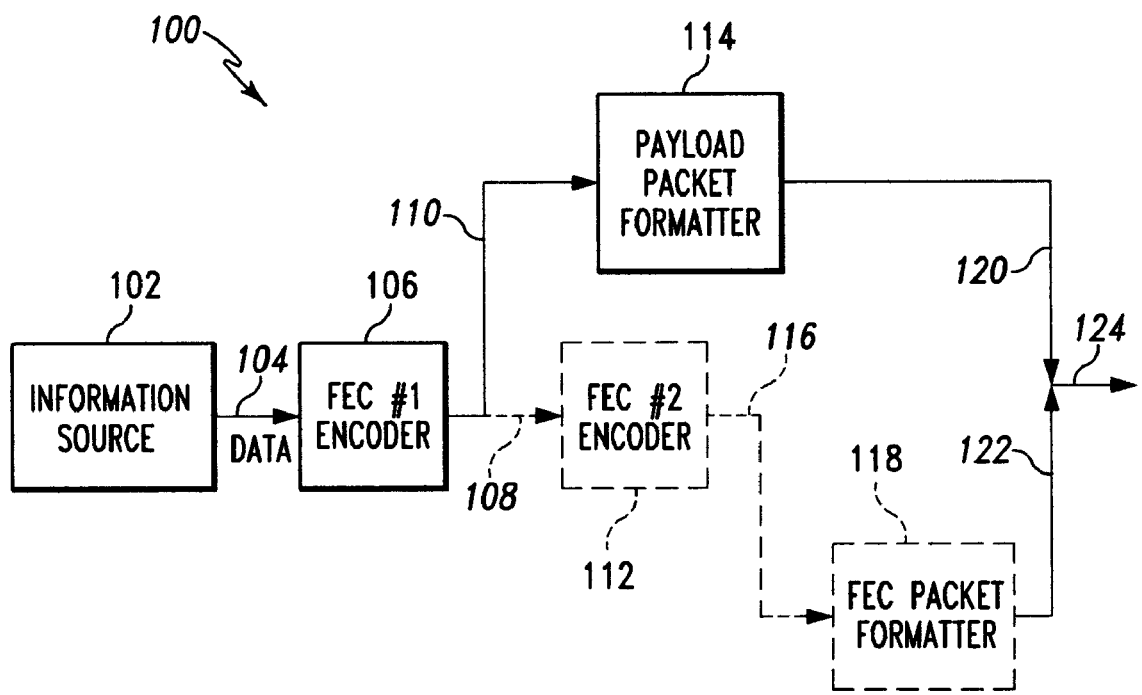
FIG. 2 is a block diagram illustrating an exemplary mechanism to format packets for transmission in accordance with an embodiment of the present invention.

FIG. 2 is a block diagram illustrating an exemplary mechanism to format packets for transmission in accordance with an embodiment of the present invention. The block diagram shown in FIG. 2 is generally referred to by the reference numeral 100. An information source 102, which may correspond to a source of digitized communication data to be transmitted from either a base unit or a mobile terminal, provides data via a signal path 104 to a first FEC encoder 106. The FEC encoder 106, which need not employ an FEC block code, may be used to provide the FEC data 20 (FIG. 1) that is included in data packets 12 (FIG. 1) whether or not additional FEC data 24 (FIG. 1) is used.

The output of the FEC encoder 106, which includes the FEC data 20 (FIG. 1) and the associated data payload 18 (FIG. 1), is delivered to a payload packet formatter 114 via a data path 110. Output from the FEC encoder 106 may be referred to as FEC encoded data. The payload packet formatter 114 may complete the formation of the FEC encoded data into a completed data packet 12 (FIG. 1). A header, such as the data packet header 16 (FIG. 1), may be created by the payload packet formatter 114. The header created by the payload packet formatter 114 may contain a location pointer to let a mobile terminal that receives the packet know on which unused TDMA time slot to look for an additional FEC packet, which contains the additional FEC parity data 24 (FIG. 1). Completed data packets are delivered by the payload packet formatter 114 to a data path 120.

As an alternative to the use of a header having a pointer to an FEC packet 14 (FIG. 1), a base unit may assign TDMA time slots in such a way that receiving mobile terminals may look for the FEC packets in pre-defined locations. For example, a payload time slot #i may be associated with a particular FEC slot #k by agreement. In such a case, the receiving mobile terminal may determine if the associated FEC slot contains an FEC Packet by checking the header of that packet to see if the packet contains additional FEC parity data.

The FEC encoded data from the FEC encoder 106 may also be delivered to a second FEC packet encoder 112 via a data path 108. The FEC packet encoder 112, which is shown in dashed lines to indicate that it may be used only when sufficient extra TDMA time slots are available, may compute additional FEC data 24 (FIG. 1) for use in an FEC packet 14 (FIG. 1) using a systematic FEC block code.

The FEC packet encoder 112 may deliver its output, which includes only additional FEC parity data, to an FEC packet formatter 118, also shown in dashed lines, via a data path 116. The FEC packet formatter 118 may complete the formation of an FEC packet, such as the FEC packet 14 (FIG. 1), by providing a header for the packet and forwarding the completed packet via a data path 122. Completed data packets from the payload packet formatter 114 and completed FEC packets from the FEC packet formatter 118 may be delivered to a transmitter (not shown) via a data path 124.

Although the components for formatting packets shown in FIG. 2 may be employed in either a base unit or a mobile terminal, different considerations may be involved in determining whether additional FEC data will be created and/or transmitted depending on whether the associated transmitter is in a base unit or a mobile terminal. On the base side, the FEC code generated by the FEC encoder 106 does not have to be a block code nor do the FEC parity bits have to be located in a contiguous block. When the FEC encoded data from the FEC encoder 106 is encoded by the FEC encoder 112, however, a systematic block code is used.

The base unit may desirably have an abundance of power available for processing circuitry (not radiated power from the antenna for data transmission). An abundance of power may be sufficiently much power to allow the base unit to create and transmit secondary FEC parity data via FEC packets 14 (FIG. 1) inserted into unused time slots with no performance penalty. In such a system, the communication range can potentially be extended for the same average allowed radiated power (or power spectral density). The same is true for FEC packet reception and processing.

With respect to transmission of additional FEC parity data by a mobile unit, mobile units are considered to have limited power, both in terms of power to process additional FEC data and power to operate a transmitter. The decision to transmit the FEC packets 14 (FIG. 1) by a base unit can be made always, however, provided that the base unit (which is the TDMA master) can allocate an empty time slot. This is true because the use of additional FEC protection is generally more efficient with respect to energy per information bit transmitted.

Figure 3:
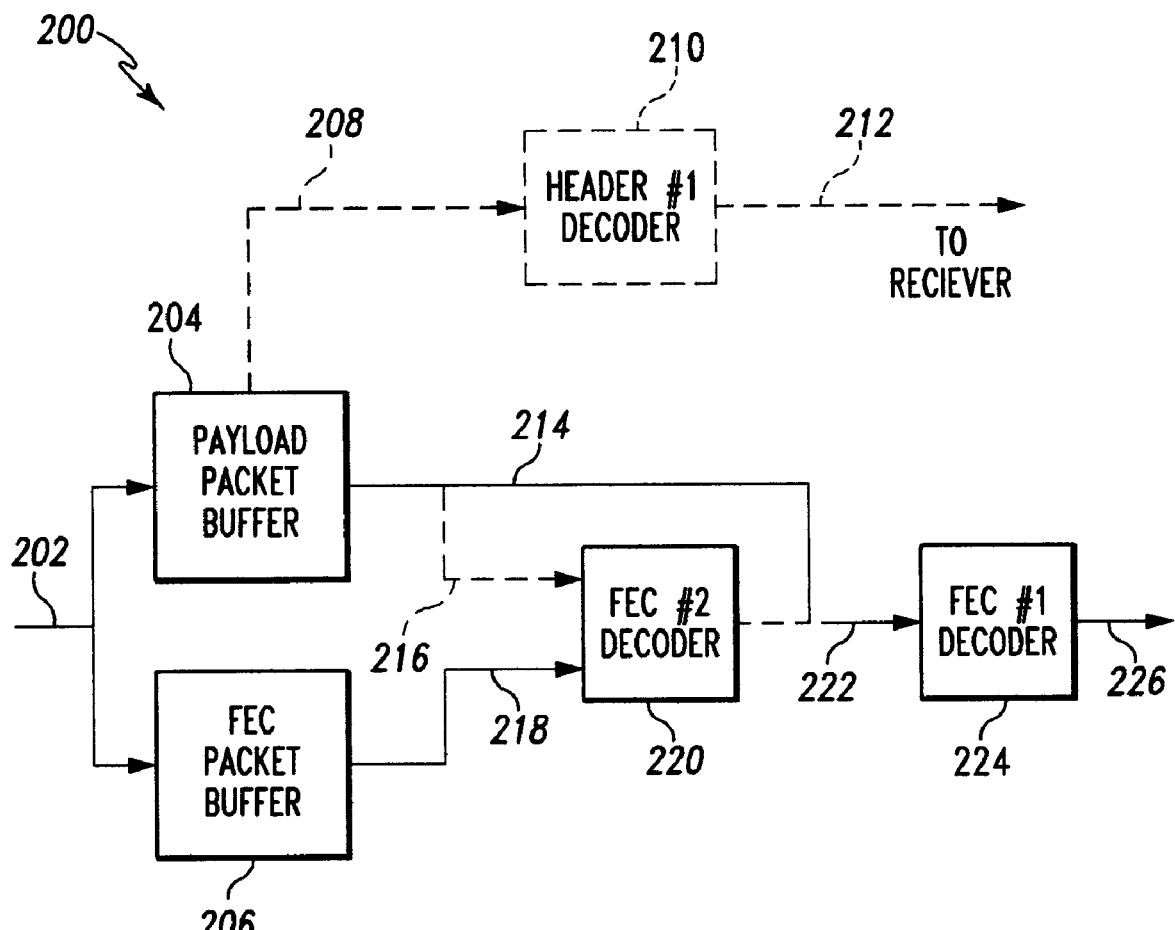
FIG. 3 is a block diagram illustrating an exemplary mechanism to process received packets in accordance with an embodiment of the present invention.

FIG. 3 is a block diagram illustrating an exemplary mechanism to process received packets in accordance with an embodiment of the present invention. The diagram is generally referred to by the reference numeral 200. Received packets may be delivered via a data path 202 to a payload packet buffer 204 or an FEC packet buffer 206.

If additional FEC parity bits are being used for a given data transmission, the header of incoming data packets may be examined by a header decoder 210 (shown in dashed lines in FIG. 3) to determine if the header of the incoming data packets 12 (FIG. 1) points to an associated FEC packet 14 (FIG. 1). If so, data may be sent to the receiver (not shown) via a data path 212 so that the incoming FEC packets may be directed by the receiver to the FEC packet buffer 206.

If additional FEC parity bits are not being used, data packets may be delivered from the payload packet buffer 204 directly to an FEC decoder 224 via a data path 214. In such a case, data packets are subject to FEC correction using only the FEC data 20 that is incorporated into all data packets.

If, however, additional FEC data is being employed to conserve battery life in a mobile terminal, for example, the data packets from the payload packet buffer 204 may be delivered to an FEC decoder 220 via a data path 216 (shown in dashed lines in FIG. 3). FEC packets 14 (FIG. 1) from the FEC packet buffer 206 may additionally be delivered to the FEC decoder 220 via a data path 218. The FEC decoder 220 may apply the FEC parity bits 24 (FIG. 1) to the data payload 18 (FIG. 1) and the FEC data 20 (or any combination thereof) contained in the data packets 12 (FIG. 1) received from the payload packet buffer 204 to produce partially corrected packet contents. The partially corrected packet contents may be delivered to the FEC decoder 224, which may apply the FEC data 20 (FIG. 1) to the partially corrected packet contents to obtain FEC-decoded payload data. The FEC-decoded payload data may be delivered from the FEC decoder 224 for further processing via a data path 226.

With regard to the decision of a mobile terminal to receive and process additional FEC data contained in FEC packets 14 (FIG. 1) transmitted by a base unit, a mobile terminal receiver may have two options: (1) to hold off decoding a data packet 12 (FIG. 1) until both the data packet and the associated FEC packet 14 (FIG. 1) are received, or (2) to ignore the FEC packet and proceed with the reception and decoding in a normal manner. Factors that influence the desirability of the use of additional FEC data by a mobile unit may include whether the incoming signal quality is marginal or whether an operating range is desired that is beyond what is achievable by the system with all the TDMA time slots loaded (i.e. when all mobile terminals are on-line).

In the case of marginal signal quality or desired additional range, the use of additional FEC data, such as the data provided by the FEC packets 14 (FIG. 1) may be desirable. If additional FEC data is being used by a mobile terminal to extend its range, those of ordinary skill in the art will appreciate that the use of an available TDMA time slot for additional FEC parity data may be lost on very short notice if an increase in the number of mobile units participating in data transmission sessions causes the time slot being used for FEC parity data to be needed for transmission of data packets.

Figure 4:
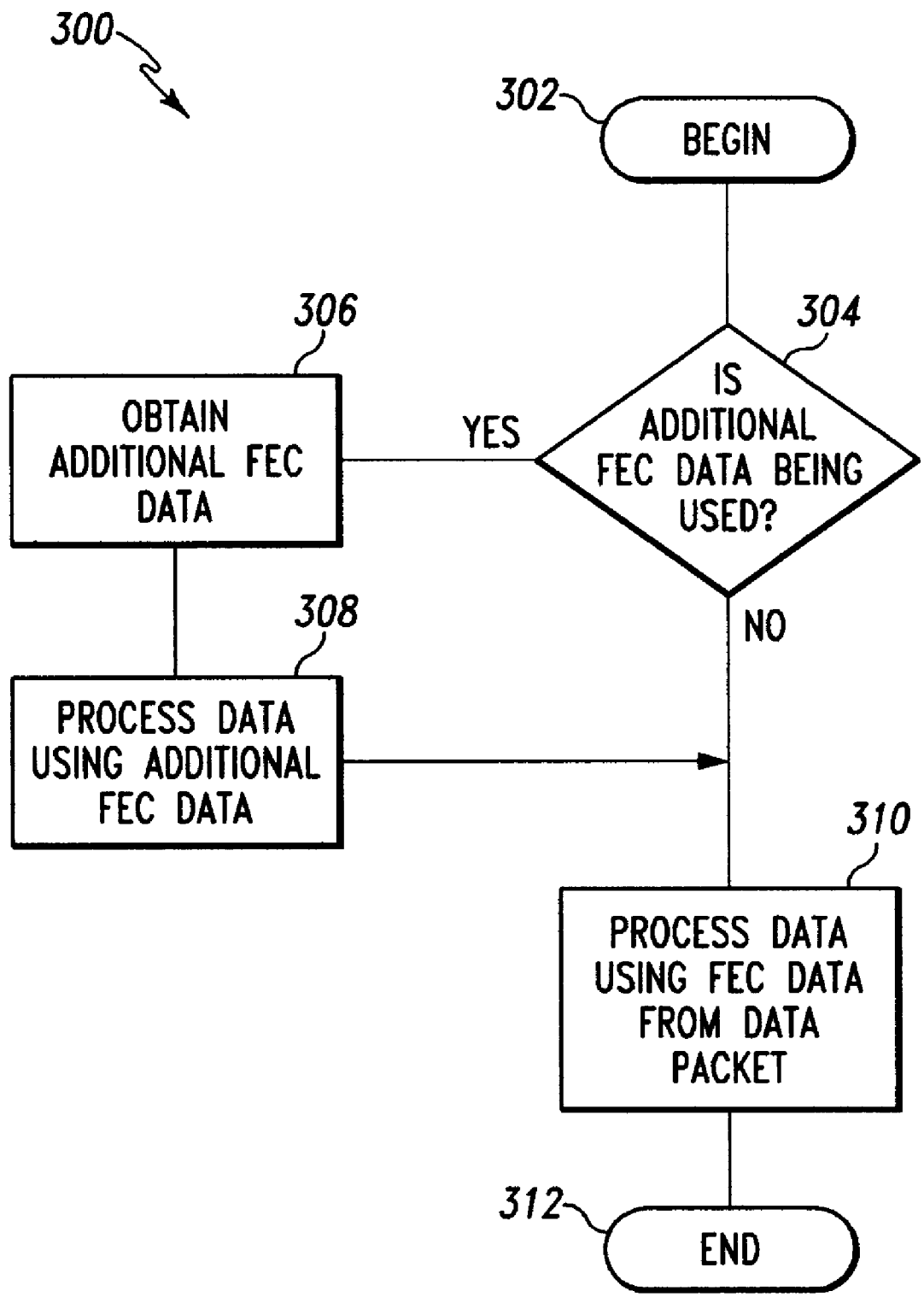
FIG. 4 is a process flow diagram illustrating the operation of an exemplary embodiment of the present invention.

FIG. 4 is a process flow diagram illustrating the operation of an exemplary embodiment of the present invention. At block 302, the process begins. At block 304, a decision is made regarding whether additional FEC data, such as FEC data 24 (FIG. 1) from an FEC packet 14 (FIG. 1), is to be used for a given data transmission. Factors influencing this decision are set forth in the discussion of FIG. 2 and FIG. 3 above. If additional FEC data is not used, data packets are processed using only the FEC data 20 (FIG. 1) that is typically included with a data packet 12 (FIG. 1).

If additional FEC data is to be used, the additional FEC data is obtained, as set forth at block 306. At block 308, incoming data is processed using the additional FEC data. At block 310, the FEC data included in the packet is applied to the partially corrected data. At block 312, the process ends.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system for generating forward error correction (FEC) packets in a time division multiple access (TDMA) system, comprising:
   a first FEC encoder that receives data and encodes first FEC data with the data to form FEC encoded data;
   a payload packet formatter that formats the FEC encoded data into a data packet and delivers the data packet to a TDMA time slot;
   a second FEC encoder, in parallel with the payload packet formatter, that encodes the FEC encoded data to produce second FEC data; and
   an FEC packet formatter, in parallel with the payload packet formatter, that formats the second FEC data into an FEC packet;
   wherein the second FEC encoder and the FEC packet formatter are only utilized when an additional TDMA time slot is available for the FEC packet.

2. The system for generating FEC packets set forth in claim 1, wherein the additional TDMA time slot is an otherwise empty TDMA time slot.

3. The system for generating FEC packets set forth in claim 2, wherein a header associated with the data packet contains information associating the data packet with the FEC packet contained in the otherwise empty TDMA time slot.

4. The system for generating FEC packets set forth in claim 2, wherein a location corresponding to the otherwise empty TDMA time slot is predetermined by a TDMA master.

5. The system for generating FEC packets set forth in claim 1, wherein the second FEC encoder employs a systematic block code to produce the second FEC data.

6. The system for generating FEC packets set forth in claim 1, wherein the FEC packet is ignored by a receiver to conserve power.

7. A system for decoding a forward error correction (FEC) packet, comprising:
   a first FEC decoder that receives an FEC packet containing first FEC data and a data packet containing a data payload and second FEC data, the first FEC decoder partially decoding the data payload and second FEC data contained in the data packet using the first FEC data contained in the FEC packet; and
   a second FEC decoder that receives the partially decoded data payload and second FEC data and further decodes the data payload based on the second FEC data.

8. The system for decoding the FEC packet set forth in claim 7, further comprising:
   a header decoder to decode a header associated with the data packet and identify the FEC packet.

9. The system for decoding the FEC packet set forth in claim 7, wherein the FEC packet is received from a predetermined time division multiple access (TDMA) time slot.

10. The system for decoding the FEC packet set forth in claim 9, wherein a location corresponding to the TDMA time slot is predetermined by a transmitter.

11. The system for decoding the FEC packet set forth in claim 7, wherein the FEC packet is ignored by a receiver to conserve power.

12. A method of processing forward error correction (FEC) packets, the method comprising the steps of:
   receiving a data packet that contains data and first FEC data;
   receiving an FEC packet that contains second FEC data;
   deciding whether to use the second FEC data to process the data packet;
   processing the data packet using the second FEC data to produce partially decoded data if use of the second FEC data is decided; and processing the partially decoded data using the first FEC data.

13. The method set forth in claim 12, further comprising the step of:
    processing the data using only the first FEC data if it is decided not to use the second FEC data.

14. The method set forth in claim 13, wherein the recited steps are performed in the recited order.

15. The method set forth in claim 12, further comprising the step of:
    ignoring the second FEC data to conserve power.

16. The method set forth in claim 12, wherein the recited steps are performed in the recited order.

17. A method for generating forward error correction (FEC) packets in a time division multiple access (TDMA) system, the method comprising the steps of:
    receiving data;
    encoding the received data with first FEC data to form FEC encoded data;
    formatting the FEC encoded data into a data packet;
    delivering the data packet to a TDMA time slot;
    determining if an additional TDMA time slot is available for an FEC packet;
    encoding the FEC encoded data to produce second FEC data only if the additional TDMA time slot is available, the step of encoding the FEC encoded data being done in parallel with the step of formatting the FEC encoded packet into a data packet; and
    formatting the second FEC data into an FEC packet only if the additional TDMA time slot is available, the step of formatting the second FEC data being done in parallel with the step of formatting the FEC encoded packet into a data packet.

18. A method for decoding a forward error correction (FEC) packet, the method comprising the steps of:
    receiving an FEC packet containing first FEC data and a data packet containing a data payload and second FEC data;
    partially decoding the data payload and second FEC data contained in the data packet using the first FEC data contained in the FEC packet; and
    further decoding the partially decoded data payload using the second FEC data.

* * * * *